United States Patent [19]

Moore et al.

[11] 4,174,988
[45] Nov. 20, 1979

[54] METHOD AND APPARATUS FOR MAKING PADDED STRAPS

[75] Inventors: Ronald D. Moore, Grosse Pointe; Everett L. Bethel, Sterling Heights, both of Mich.

[73] Assignee: Chivas Products Ltd., Warren, Mich.

[21] Appl. No.: 829,227

[22] Filed: Aug. 31, 1977

Related U.S. Application Data

[63] Continuation of Ser. No. 653,669, Jan. 30, 1976, abandoned.

[51] Int. Cl.$^2$ .................................. B29C 17/04
[52] U.S. Cl. ............................ 156/213; 156/221; 156/272; 156/475; 156/492; 156/494
[58] Field of Search ..................... 156/212–225, 156/200–202, 443, 475, 486, 488, 492–493, 479; 297/461, 457, 458, DIG. 1; 190/57; 428/71; 16/125

[56] References Cited

U.S. PATENT DOCUMENTS

| | | | |
|---|---|---|---|
| 1,977,626 | 10/1934 | Finkelstein | 190/57 |
| 3,115,227 | 12/1963 | Shanok | 190/57 |
| 3,318,636 | 5/1967 | Callum | 297/457 |
| 3,393,939 | 7/1968 | Jacobi | 297/426 |
| 3,736,621 | 6/1973 | Szabo | 16/125 X |

*Primary Examiner*—David A. Simmons
*Attorney, Agent, or Firm*—Harness, Dickey & Pierce

[57] ABSTRACT

A method and apparatus for manufacturing padded or cushioned straps having a main structural strap member adatped to be fastened to a surface, a vinyl wrap or cover and a foam cushion material intermediate the vinyl wrap and the strap member. The method of the present invention includes the steps of (1) longitudinally tensioning the vinyl wrap, (2) positioning the foam cushioning material and the strap member on the vinyl wrap, (3) compressing the foam and securing the components in position by applying a force across the strap member and the vinyl wrap, (4) wrapping and transversely tensioning the vinyl wrap about the foam member and the strap member so that the longitudinal edges are opposed, (5) maintaining the vinyl wrap in transverse tension and maintaining the position of the components, (6) positioning a trim strip across the opposed longitudinal edges of the vinyl wrap, (7) joining the trim strip to the vinyl wrap by dielectric heating of the trim strip and the vinyl wrap, (8) bending the assembled strap to an appropriate shape, and (9) heating the assembled strap to shrink the vinyl wrap. The apparatus disclosed herein provides a convenient structure for practicing the above method.

49 Claims, 23 Drawing Figures

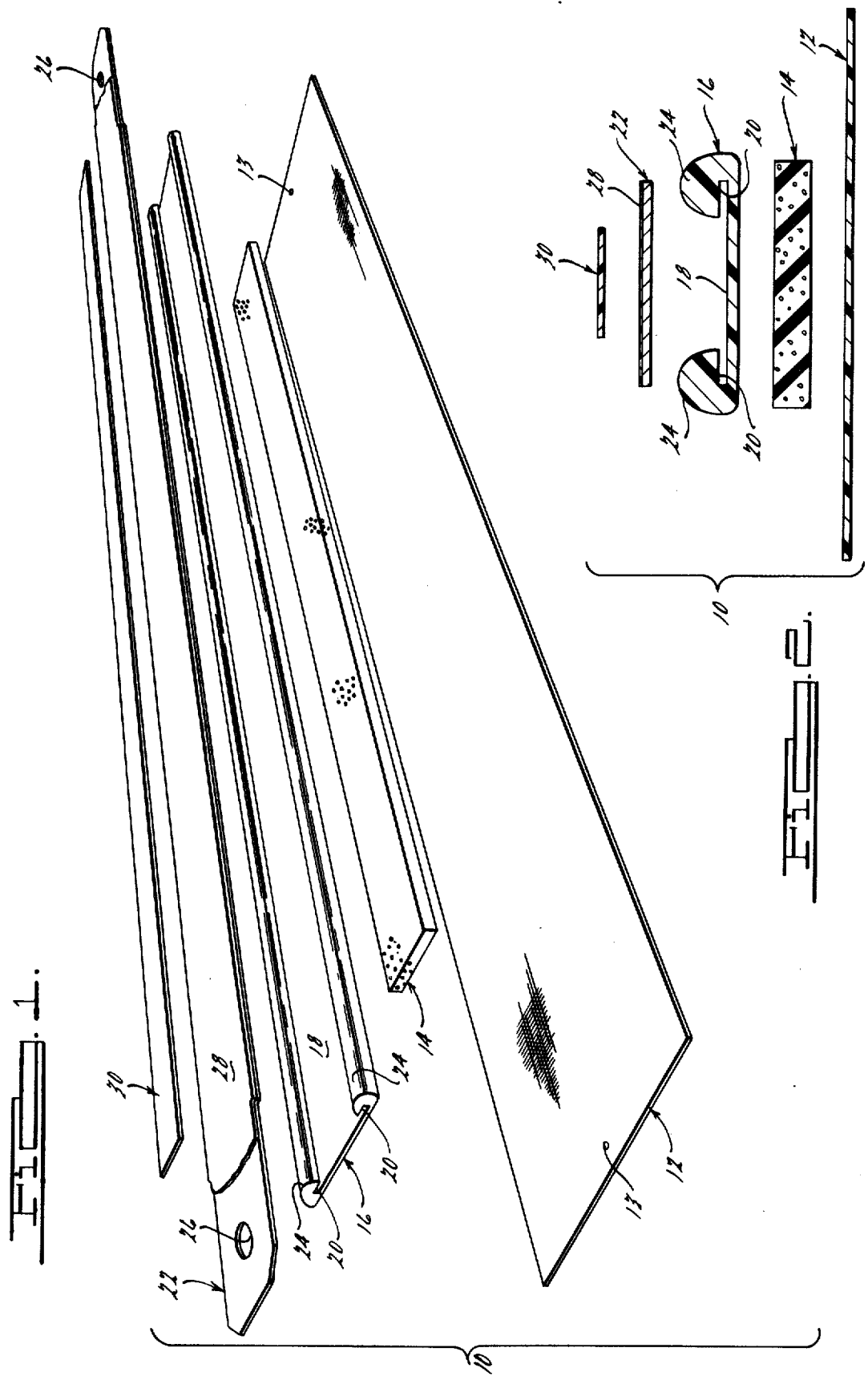

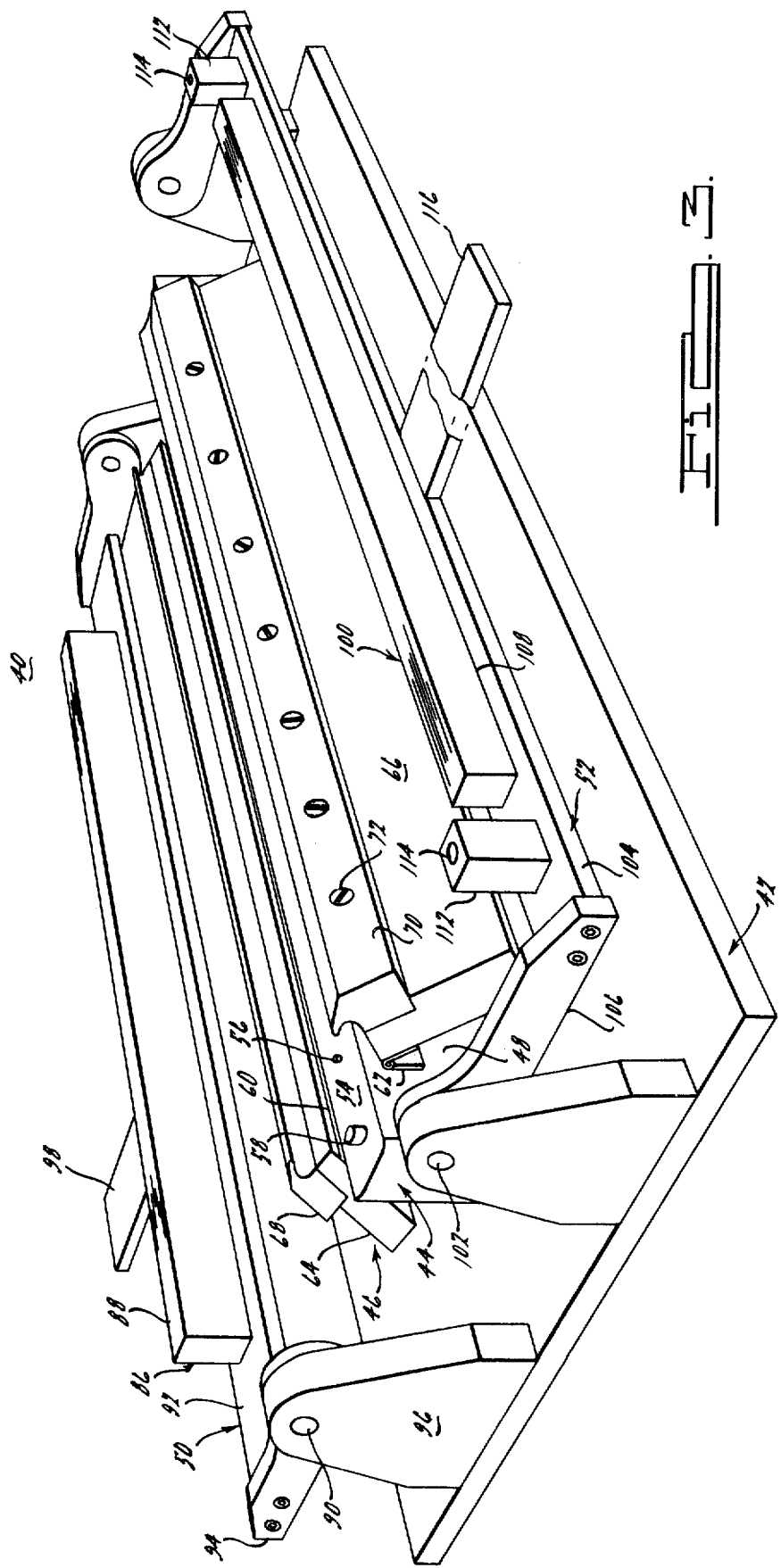

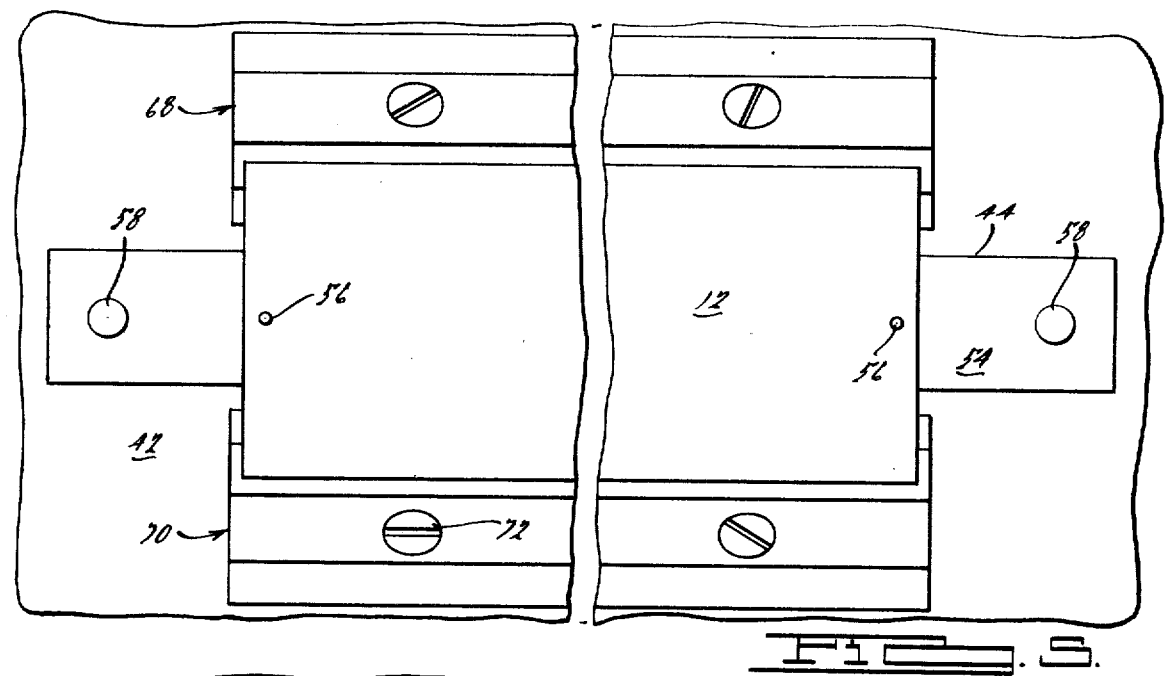
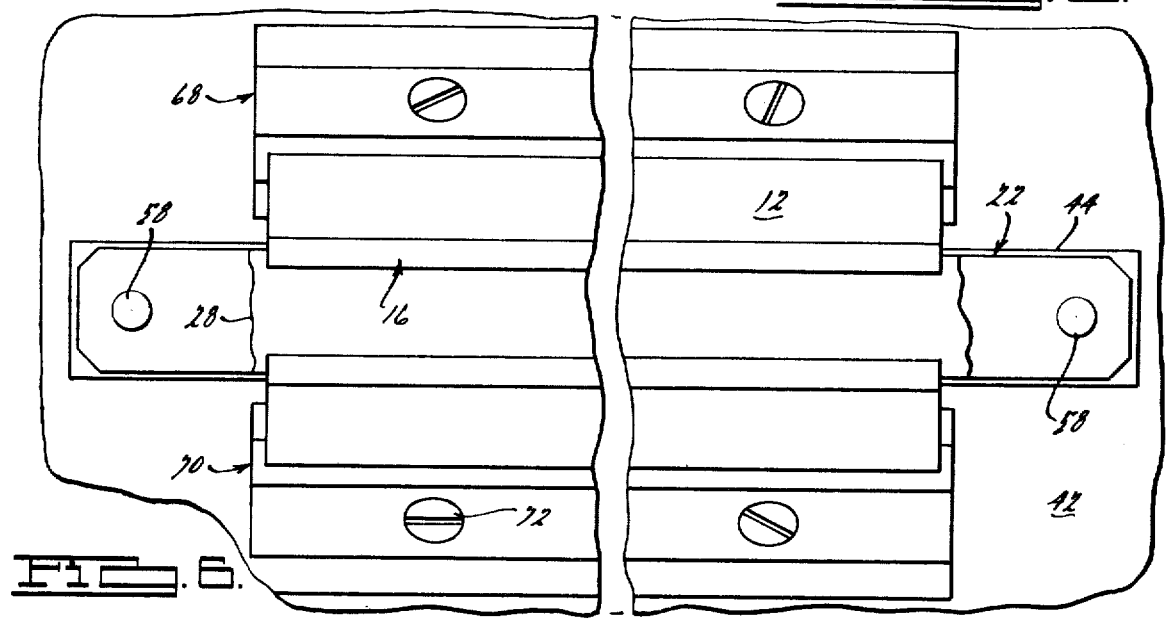
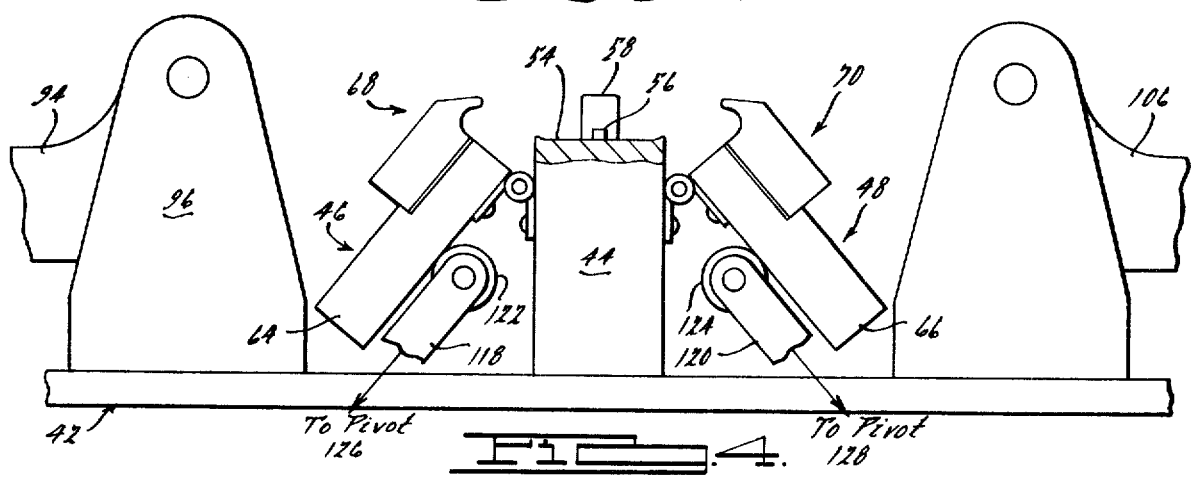

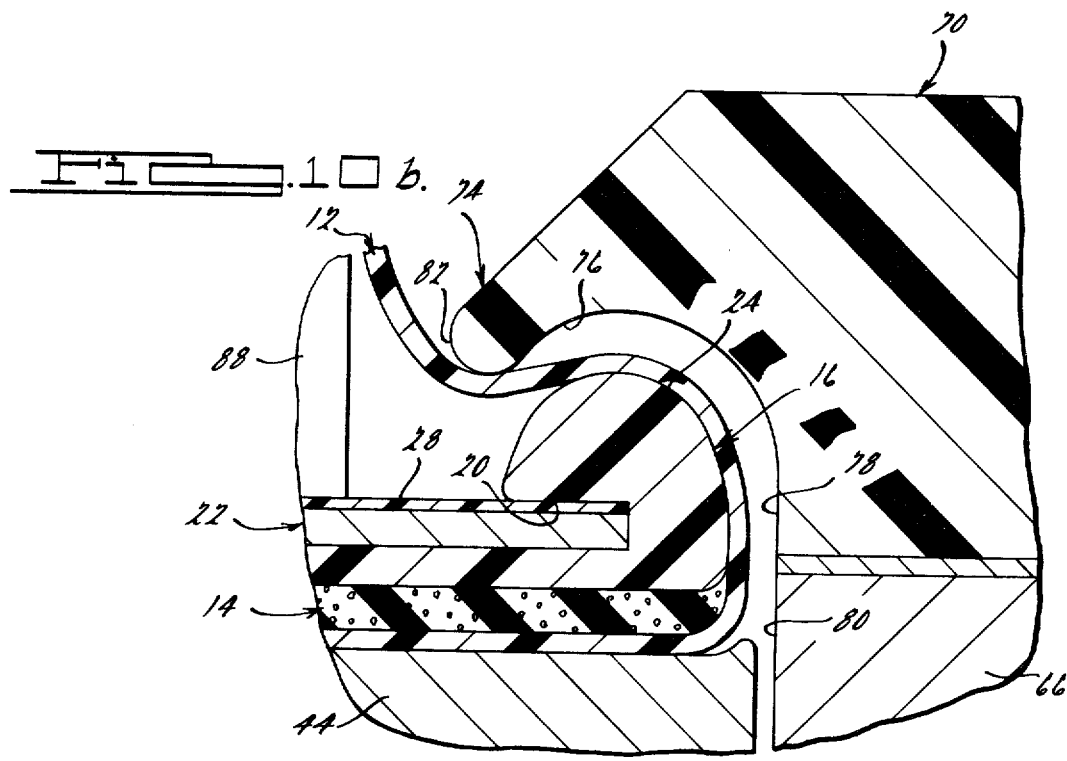
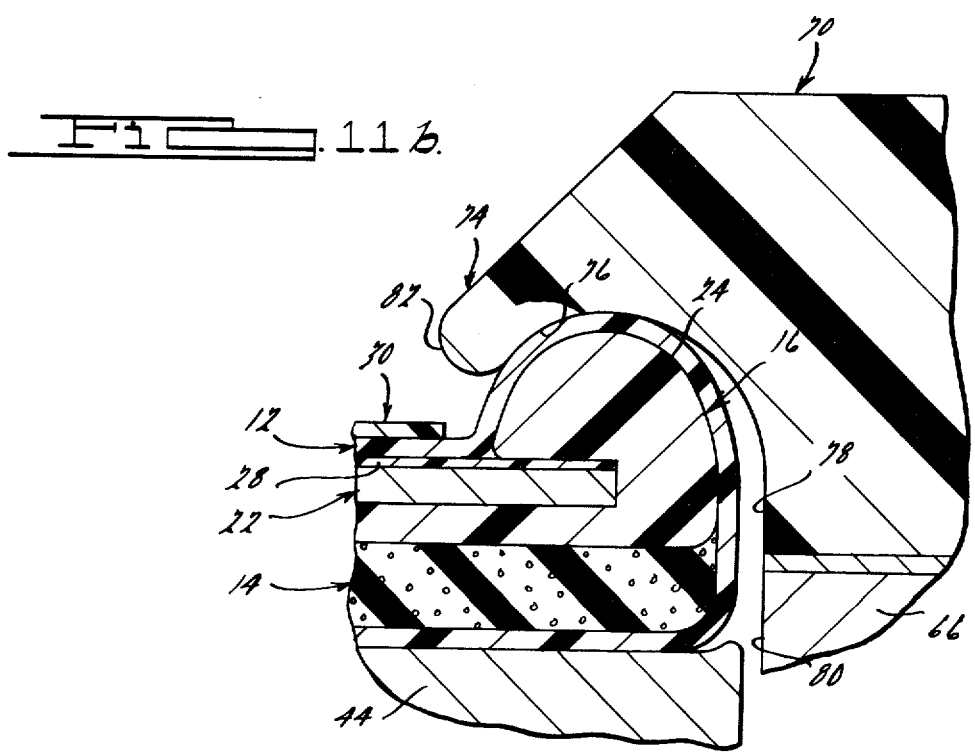

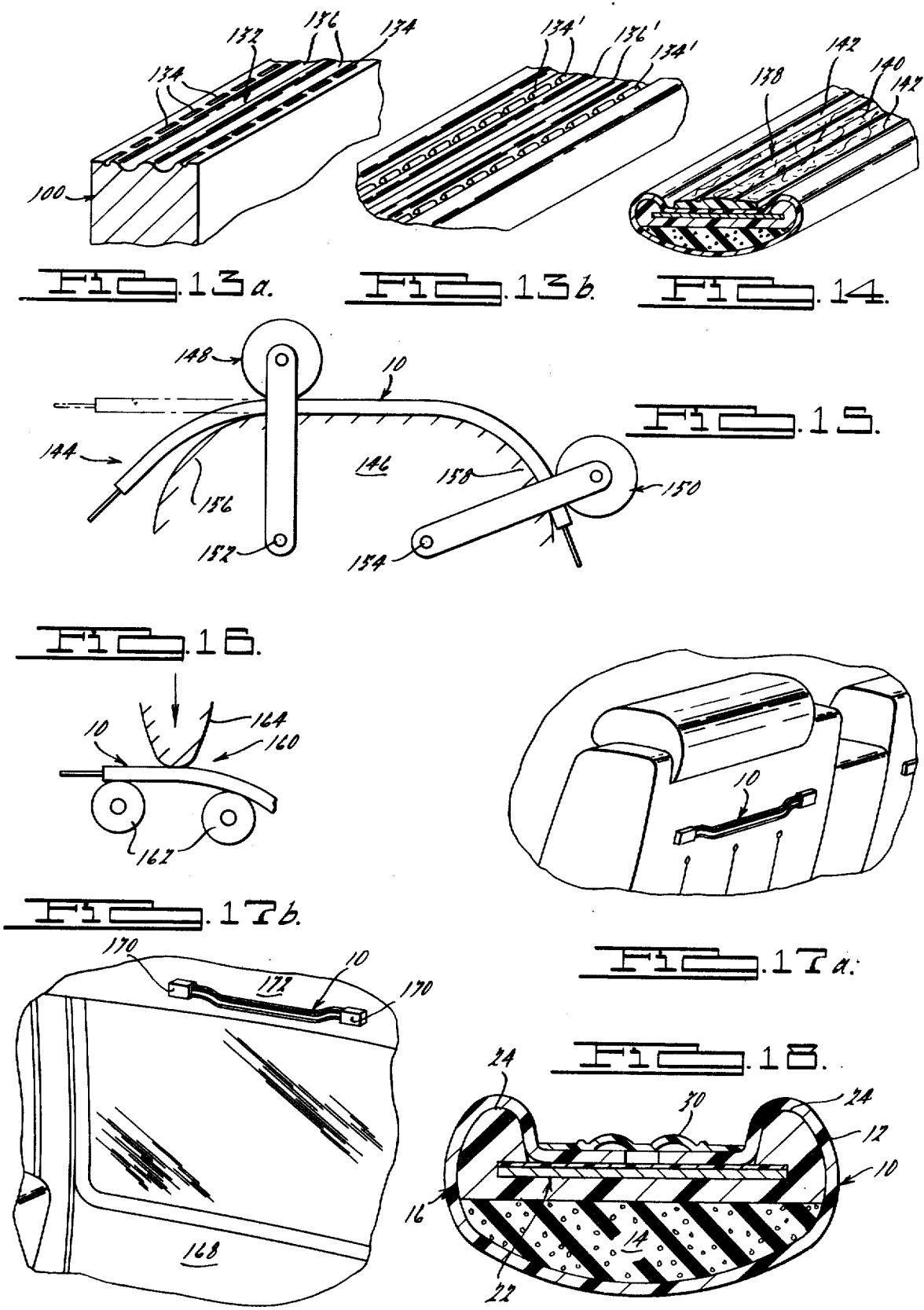

METHOD AND APPARATUS FOR MAKING PADDED STRAPS

This is a continuation of application Ser. No. 653,669, filed Jan. 30, 1976, now abandoned.

SUMMARY AND BACKGROUND OF THE INVENTION

The present invention is the preferred method for manufacturing the padded or cushioned strap disclosed in our related application Ser. No. 538,538, filed Jan. 6, 1975, now U.S. Pat. No. 3,952,383 entitled "Strap Fitting for Automobile Interior and Other Uses" and our related application Ser. No. 653,668, now U.S. Pat. No. 3,977,054, filed (same day as this application), entitled "Strap Fitting For Automobile Interior and Other Uses", which is a continuation-in-part of the first mentioned related application. The teachings of said related applications are incorporated in this application by reference thereto.

The strap disclosed in the above referenced applications has met with great commercial success in the automotive industry. As a result, a wide variety of applications for such straps had developed, such as door pulls, as passenger entry/exit assist straps and as seat back assist straps. These applications generally require multiple strap installations in each vehicle, and, in that this strap has been adopted for use in numerous different makes and models of vehicles, it becomes readily apparent that the method and apparatus for manufacturing these straps must be both reliable and capable of extremely high volume production in order to meet the demands of the automobile industry. Further, as in any high volume production article, the method must be economical and efficient to perform.

Also, in that the success with which the strap has been greeted is due at least in part to the fact that the strap offers a smooth, wrinkle-free surface having a cushioned soft feeling of elegance, the methods and apparatus for manufacturing them must be capable of achieving these objectives as well as being suitable for use with a wide variety of outer coverings and trim strips so as to allow production of straps which will blend with or accentuate a wide variety of decors. In order to achieve these results, it is important that the apparatus accurately position the strap components relative to each other, slightly compress the cushioning material as the outer wrap is applied, and that the covering material be tensioned slightly both laterally and longitudinally. It is readily apparent that to manufacture this strap even by hand would be a difficult, tedious and time consuming operation; and to adapt machinery and methods capable of high production capacity with a minimum of time and expense while still producing straps identical in appearance, serves to multiply and compound the problems associated therewith.

The present invention provides a solution to these problems through a method and apparatus which is capable of high volume production, is economical both in labor and materials, and produces a strap having the luxurious soft cushioned feel, as well as an elegant, distinctive, smooth, wrinkle-free appearance.

In the method and apparatus of the present invention, the vinyl wrap or cover is longitudinally tensioned by securing the ends of the vinyl wrap on a base member of a fixture. This can be conveniently accomplished by providing small holes through the vinyl wrap near its ends and by providing pins which protrude from the base member of the fixture to receive the holes in the vinyl wrap while the wrap is longitudinally tensioned. The wrap remains longitudinally tensioned in this manner throughout the assembly process on the fixture as described hereinafter. The foam member is centrally positioned on the tensioned vinyl wrap and the structural strap member is centrally positioned on the foam member. In the preferred construction of the padded strap, the main structural member is provided with an adapter strip having an uncercut groove which receives the adapter strip. Additionally, the main structural member has a plastic adhesive coating on its surface opposite the foam member.

With the vinyl wrap, foam member and main structural strap in position, the foam member is compressed by applying a force across the main strap member and the vinyl wrap. Conveniently, this is accomplished by bearing a clamping bar on top of the main strap member with a predetermined force which compresses the foam member. The clamping bar also serves to secure the vinyl wrap, the foam member and the main structural strap member in their symmetrical positions. The fixture is provided with a pair of hinged jaws, one hinged to each side of the fixture base member. The hinged jaws rotate upwardly and inwardly while bearing against the vinyl wrap so as to transversely tension the vinyl wrap and to wrap the vinyl wrap about the foam member and the structural strap member. Rotation of the jaws continues until the jaws are positioned above the upper surface of the main strap member.

When the clamping bar is removed, the foam expands to bear the upper portion of the wrapped strap assembly against the hinged jaws. This bearing force is sufficient to maintain the precompression of the foam member, to maintain the transverse tensioning of the vinyl wrap, and to maintain the vinyl wrap, the foam member and the structural strap member in position after the clamping bar is removed. At this point in the method, the longitudinal ends of the vinyl wrap lie on the upper surface of the strap member and are transversely opposed. A trim strip is then positioned across the opposed longitudinal edges of the vinyl wrap. After positioning of the trim strip, a dielectric sealing bar is forcibly engaged with the vinyl trim strip and the trim strip is joined to the vinyl wrap by passing high frequency energy between the dielectric sealing bar and the structural strap member. Preferably, the dielectric joining process joins the trim strip, the opposed longitudinal edge portions of the vinyl wrap, and the plastic coating material on the main strap member so that the trim strip, the vinyl wrap and the main strap member are each secured to the other.

At this point in the method, the assembly is removed from the fixture for further processing. The strap is bent to provide it with a configuration which is suited for its intended use. Thereafter, the padded strap assembly is placed in an oven for heating at a predetermined temperature for a predetermined period. The temperature and period of heating is selected so as to shrink the vinyl wrap sufficiently to remove wrinkles which may have formed during the bending operations.

In view of the above description of the preferred method of this invention, it will be appreciated that a convenient apparatus and procedure is provided for tensioning the vinyl wrap both longitudinally and transversely, to prestress the foam member during wrapping of the strap, to maintain the prestress of both the foam member and vinyl wrap during the dielectric adhesion process, and to ultimately provide a strap construction having the appropriate compression of the foam member, tensioning of the vinyl wrap, and which is substantially wrinkle free.

BRIEF DESCRIPTION OF THE DRAWINGS

FIG. 1 is an exploded perspective illustration of the component parts of the padded strap assembled by the method and apparatus of this invention;

FIG. 2 is a cross sectional exploded view of the components of FIG. 1;

FIG. 3 is a perspective illustration of the fixture used with the method of assembling the components of FIGS. 1 and 2 according to the present invention;

FIG. 4 is a partially cross sectional and partially side elevational view of the fixture used with the method of assembling the components of FIGS. 1 and 2 according to the present invention;

FIGS. 5-12 are illustrations of the steps of the method of the present invention as performed by the apparatus of the present invention;

FIG. 13a is an illustration of the dielectric bar used with the apparatus of FIG. 3 and FIG. 13b is an illustration of the resultant trim strip impression made by the dielectric bar of FIG. 13a;

FIG. 14 is an illustration of an alternate trim strip;

FIGS. 15 and 16 are illustrations of further steps of the method of the present invention;

FIGS. 17a and 17b are illustrations of the padded strap as constructed by the method and apparatus of the present invention shown in typical automotive uses; and FIG. 18 is a cross sectional view of the padded strap as constructed by the method and apparatus of the present invention.

DETAILED DESCRIPTION OF THE PREFERRED EMBODIMENT

Figure 7:
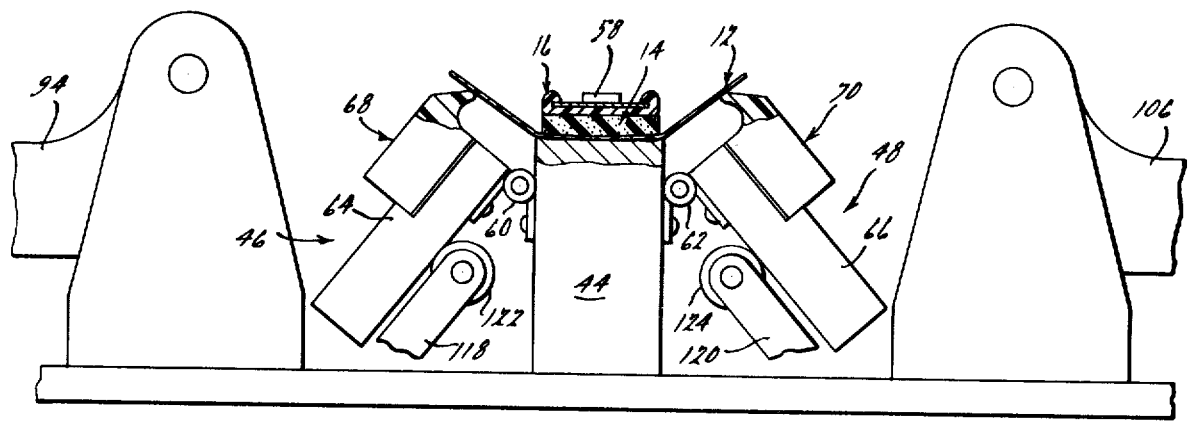

In FIGS. 1 and 2, the components of a padded strap 10 are illustrated prior to assembly. These components include a vinyl wrap or cover 12 which may be a vinyl impregnated cloth. Alternatively, it may be any other suitable synthetic or natural material including cloth, leather, etc. With certain of these other materials, a plastic or other suitable adhesive may be necessary for joining the component parts as described hereinafter. The padded strap 10 further includes a cushion or pad member 14 of rectangular cross section which may be constructed of polyurethane foam. Alternatively, the pad member may be made of a vinyl or rubber foam material. The padded strap 10 further includes an adapter strip 16 having a channel or grooved area 18 which is undercut at locations 20 so as to securely receive a main structural strip 22. The adapter strip 16 is preferably constructed by extruding a material such as a vinyl, rubber or other plastic material. The adapter strip 16 is of generally solid plastic construction and is preferably yieldable but not nearly as compressible as the foam material of the cushion strip 14. As shown, the adapter strip 16 has parallel raised shoulders 24 which extend along the length of the adapter strip 16 at opposite sides thereof and which influence the final configuration of the padded strap 10 as will be appreciated in view of the description appearing hereinafter.

The main structural base strip 22 may be constructed of a steel strip material. Alternatively, the base strip 22 may be constructed of a strong plastic material. If a plastic material is used, a foil or other conducting material must be attached, embedded or impregnated with the base strip 22 if a dielectric joining method is to be used. The base strip 22 has its ends adapted to be fastened to a surface, for example, by an opening 26 at each end or other suitable fastening means. The base strip 22 has a plastic coating 28 on its upper surface to facilitate dielectric bonding as will be disclosed. As illustrated, the ends of the base strip 22 are undercut and chamfered to facilitate mating with a decorative end piece (not shown).

A trim or facing strip 30 completes the strap assembly 10. The facing strip 30 may be a strip of the same vinyl impregnated fabric material as the cover 12 or may be any special strip adapted for adhesion to the cover 12 including fabrics, metals, plastics, etc. Such adaption for adhesion to the cover 12 may include a plastic coating or material on the underside of the facing strip 30.

In FIG. 3, a fixture 40 for practicing the method of the present invention is illustrated. The fixture 40 is illustrated on a platform or table 42 and is seen to comprise a base member 44, a left jaw assembly 46, a right jaw assembly 48, a clamping bar assembly 50 and a dielectric bar assembly 52. The base member 44 has a mating or working surface 54 which is adapted to receive the cover 12. A pair of pins 56 (only one visible in FIG. 3) are embedded in the base member 44 and project slightly above the surface 54 for engaging openings in the cover 12 so that the cover 12 may be longitudinally prestressed. A second pair of pins 58 (only one visible in FIG. 3) are also embedded in the base member 44 and project above the surface 54 for receiving the openings 26 in the base strip 22. The upper surface 54 is contoured to have a slightly concave cross section so as to appropriately conform to the cross section of the assembled strap 10 when the cover 12 is under transverse tensioning as will be described.

The jaws 46 and 48 are connected to the base member 44 by hinges 60 and 62 to provide a rotational movement of the jaw assemblies 46 and 48 relative to the base member 44. Jaw assemblies 46 and 48 have respective jaw bars 64 and 66, which are supported by rotatable portions of the hinges 60 and 62, and respective jaws 68 and 70 which are secured to the jaw bars 64 and 66 by suitable fasteners 72.

With reference now to FIG. 4, the cross section of the jaws 68 and 70 can be best appreciated. In FIG. 4, jaw assembly 48 is shown in its clockwise position. The jaws 70 have a hooked portion 74 which is defined by an undercut curvilinear surface 76 and a contiguous planar surface 78. The planar surface 78 is coplanar with the end surface 80 of the jaw bar 48. The curvilinear surface 76 ends in a nose portion 82. The nose portion functions to guide the wrap around the adapter strip 16 as the jaw bar 48 is rotated about the axis 84 of hinge 62 and causes transverse tensioning of the cover 12 by a frictional sliding engagement between the nose 82 and the cover 12. The curvilinear portion 76 is undercut to receive the shoulders 24 of the adapter strip 16.

The clamping assembly 50 includes a clamping bar 86 having a clamping surface 88 for a purpose to be explained. The clamping bar is pivotally movable about the axis of a pivot 90 by means of a support bar 92 and a pivot arm 94. The pivot 90 is supported by means of pivot supports 96. The spacing of the pivot 90 relative to the center line of the base member 44 is established so that upon clockwise rotation of the clamping bar 88 about the axis 90, the clamping bar 88 is symmetrically positioned along the center line of the upper surface 54 of the base member 44 as it bears upon the strap member 22. Clockwise rotation of the clamping bar 88 may be accomplished, for example, by means of a handle 98 which may be manually movable or movable by a suitable actuator (not shown).

On the opposite side of the base member 44, a similar structure is provided for rotating a dielectric joining bar 100 into substantially the same position with respect to the base member 44 at a subsequent time. More specifically, the dielectric joining bar 100 is pivotally mounted about the axis of a pivot 102 by means of a support bar 104 and pivot arm 106. The pivot 102 is supported at an appropriate location relative to the base 42 and the center line of the base member 44 by means of pivot supports 108. The pivot supports 108 are constructed of a dielectric material to electrically insulate the dielectric joining bar 100 from the base member 44. Accordingly, the dielectric bar 100 may be rotated into position above the surface 54 in alignment with the center line with the base member 44 and symmetrically positioned between the pins 56 and 58 for the purpose of dielectrically joining the cover 12, the trim strip 30 and the base strip 22.

The support bar 104 carries a pair of resilient dielectric clamping members 112 having a bore 114 which is adapted to mate with the respective ones of the pins 58. The clamping members 112 engage respective end portions of the base strap 22 about the opening 26 to make good electrical contact between the base strap 22 and the surface 54 of the base bar 44. The clamping members 112 may be constructed of a rubber of neoprene material. Dielectric assembly 52 may be rotated counterclockwise either manually by a handle 116 or by a suitable actuator (not shown).

With reference to FIG. 4, the jaw assemblies 46 and 48 may be rotated upward, i.e., clockwise and counterclockwise, respectively, by means of pivoted actuators 118 and 120. The pivoted actuator has a roller 122 which engages the lower surface of the base plate 64 of the jaw assembly 46. Likewise, the pivoted actuator 120 includes a roller 124 which engages the lower surface of the base plate 66 of the jaw assembly 48. The actuator 118 is rotatable in the counterclockwise direction about an axis 126 to rotate the base plate 64 in a clockwise direction. Similarly, the actuator 120 is rotatable in the clockwise direction about an axis 128 to rotate the base plate 66 in the counterclockwise direction. The rotation of actuators 118 and 120 occurs simultaneously in like degree so that the jaws 68 and 70 are simultaneously moved into a position which partially extends over the upper surface 54 of the base member 44.

In FIG. 5, the first step of the method according to the present invention is illustrated. In the figure, the fixture 40 is not illustrated in its entire length for purposes of clarity. As can be seen in the figure, the cover 12 is positioned on the upper surface 54 of the base member 44. The cover 12 has openings 130 adjacent its longitudinal extremities which are engaged with the pins 56 which protrude from the base member 44. The openings 130 in the cover 12 are longitudinally spaced apart a slightly shorter distance when the vinyl wrap 12 is in its relaxed state than the spacing of the pins 56. Accordingly, the cover 12 must be slightly stretched to cause engagement of the openings 130 with the pins 56. This stretching provides a longitudinal tension which aids in avoiding wrinkles in the completed strap construction.

With reference now to FIG. 5, the strap 22 has been positioned over the cover 12 with the openings 26 in the strap 22 receiving the pins 58 which protrude from the upper surface 54 of the base member 44. The cover 12, being considerably wider than the strap 22, extends laterally to each side of the strap 22. In the preferred embodiment, the strap 22 is provided with the adapter strip 16 and the coating 28 prior to placement on the cover 12. Note that the pins 56 do not protrude through the strap 22. Accordingly, to avoid interference with the strap 22, the projection of the pins 56 is approximately equal to the thickness of the cover 12. The projection of the pins 58, however, is considerably greater than the projection of the pins 56. Note that the pins 56 and 58 locate the strap 22 relative to the cover 12 thereby aiding the positioning of the cover 12 and the strap 22.

Figure 8:
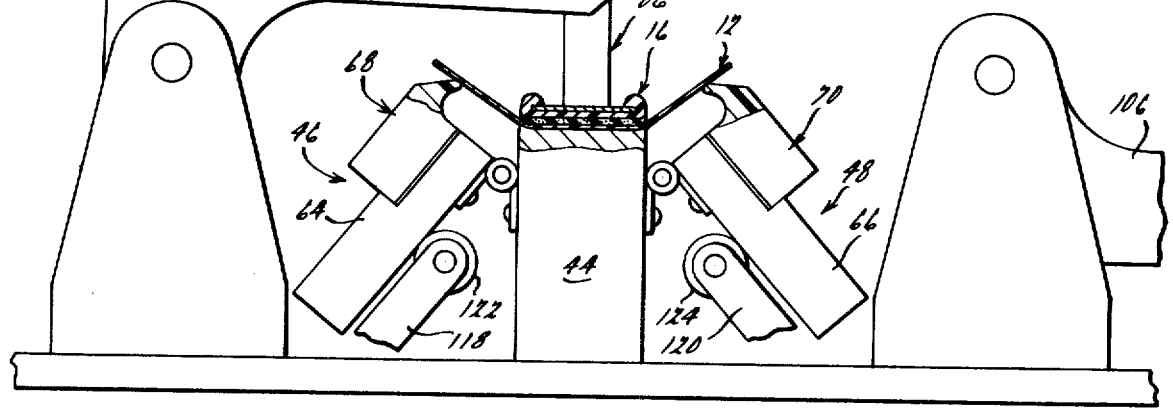
Figure 9:
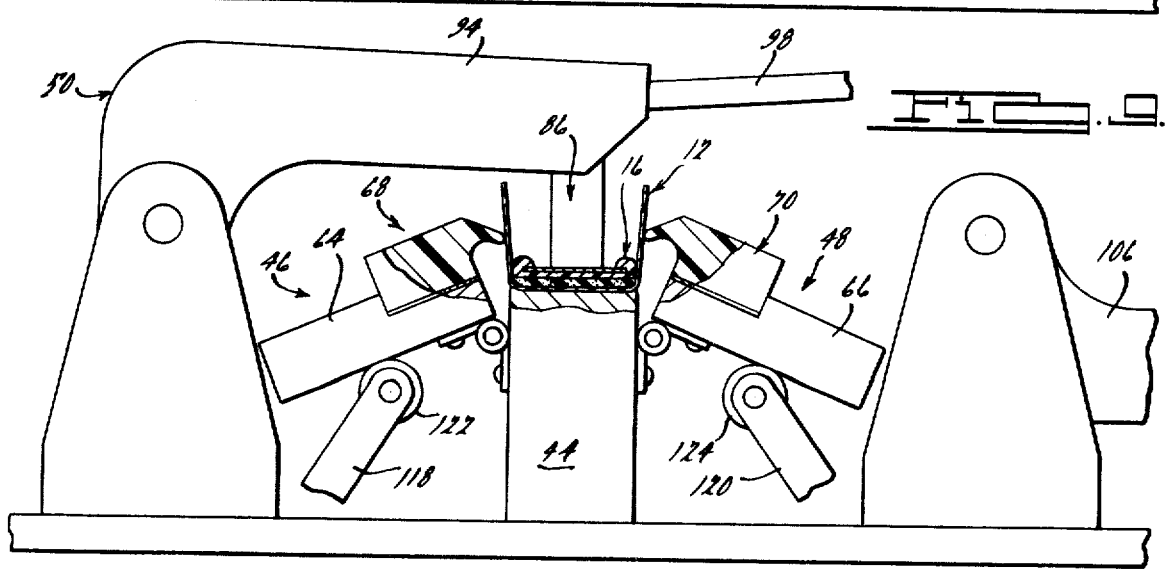

In FIG. 7, the cover 12, the foam member 14, the adapter strip 16 and the steel strap 22 are shown in their respective positions on the base plate 44 of the fixture 40. Note that the foam member is in its uncompressed state in that figure. In FIG. 8, the clamping bar assembly 50 has been moved to position the clamping bar 86 over the center line of the base member 44 so that it bears upon the longitudinally-extending central portion of the upper surface of the strap 22. The clamping bar 86 bears upon the strap 22 with sufficient force so as to compress the pad member 14 as illustrated. This clamping force is maintained to maintain the compression of the pad member 14 while the actuators 118 and 120 rotate to rotate the jaw assemblies 46 and 48 relative to the base member 44. As the jaw assemblies 46 and 48 rotate relative to the base member 44, the nose 82 of the jaws 68 and 70 bears against the cover 12 and begins to wrap the cover 12 about the cushion member 14, the adapter strip 16 and the steel strap 22 as can be best seen in FIG. 9. Note that the compression of the pad member 14 provides clearance for the jaws 68 and 70 relative to the shoulders 24 of the adapter strip 16 so that the noses 82 of the jaws 68 and 70 may pass over the shoulders 24 of the adapter strip 16 with the cover 12 interposed between the noses 82 of the jaws 70 and the shoulders 24 of the adapter strip 16. The clamping bar 86 is sufficiently narrow relative to the strap 22 so that the jaws 68 and 70 may be partially positioned over the strap 22. That is, the longitudinal edges of the clamping bar 86 are positioned inwardly of the longitudinal edges of the strap 22.

Figure 10A:
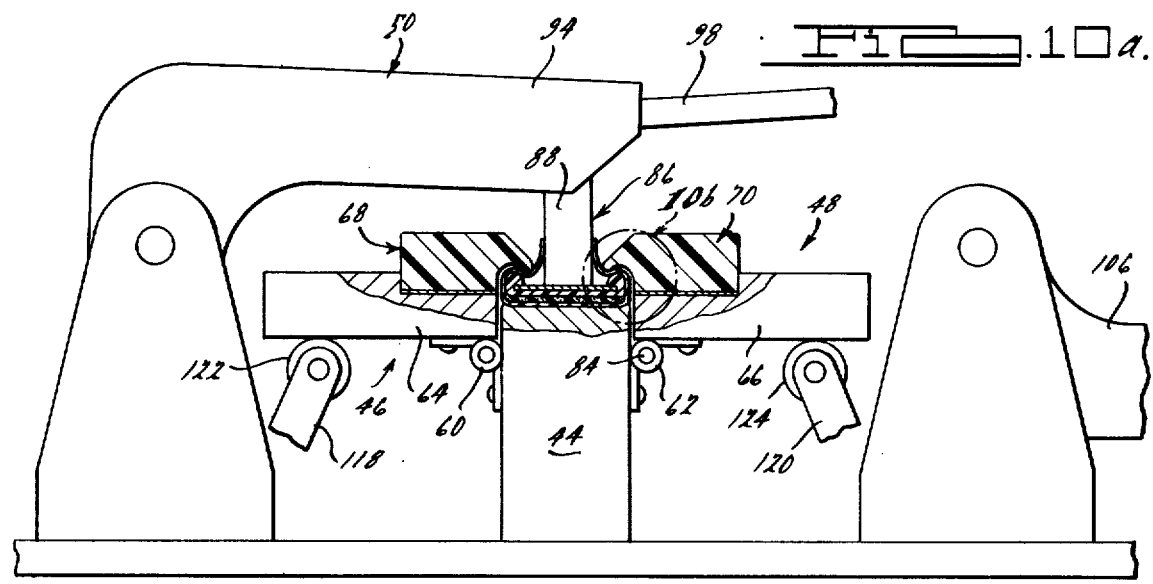

In FIGS. 10a and 10b, the jaw members 46 and 48 are in their full clockwise and counterclockwise positions, respectively. As best seen in FIG. 10b, the shoulders 24 of the adapter strip 16 are positioned directly below the highest point of the arc of the curvilinear jaw portions 76 of the jaws 68 and 70 and that longitudinal ends of the vinyl wrap 12 are positioned above the strap 22 with the cover adjacent the ends interposed between the shoulders 24 of the adapter strip 16 and the curvilinear portion 76 of the jaws 68 and 70. Note that with the clamping bar 86 in position bearing against the strap member 22, there remains a small degree of clearance between the curvilinear portion 76 of the jaws 68 and 70 and the shoulders 24, even with the cover 12 interposed between the shoulders 24 and the jaws 68 and 70.

Figure 11A:
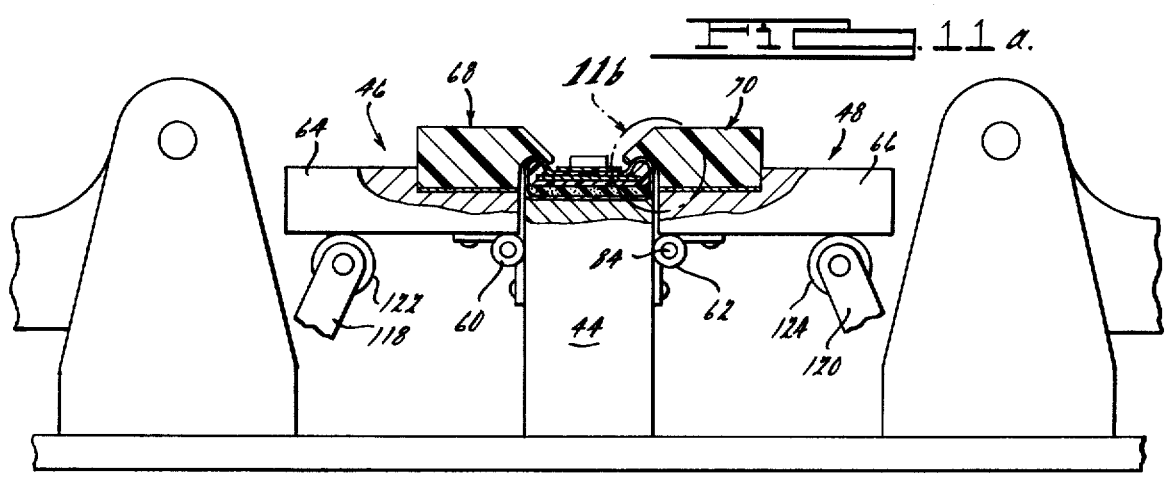

With reference now to FIGS. 11a and 11b, the clamping bar 86 has been removed so that the compression of the cushion strip 14 has been partially relieved. As a consequence, the strap member 22 and the associated adapter strip 16 have moved upwardly so that the shoulders 24 of the adapter strip 16 now bear against the cover 12 which in turn abuts against the curvilinear surface 76 of the jaws 68 and 70. As best seen in FIG. 11b, the cover portion above the highest point of the shoulders 24 abut the highest point of the curvilinear portions 76 of the jaws 68 and 70 so that the shoulders 24 are accurately positioned by the jaws 68 and 70. In this regard, movement of the adapter strip 16 to the left or right as viewed in the figure would be met with resistance since the shoulders 24 of the adapter strip 16 would be cammed downwardly by the curvilinear portion 76 of the adapter strip 16. The transverse tension of the cover 12 is maintained by the clamping force applied to the cover 12 between the shoulders 24 and the curvilinear portion 76 of the jaws 68 and 70. It will be appreciated that this clamping force is provided by the partially compressed cushion strip 14.

Once the clamping bar 86 has been removed from the upper surface of the strap member 22, the longitudinal ends of the cover 12 are allowed to fall inwardly between the strap member 22. Note that the longitudinal edges are spaced apart in FIG. 11a. Removal of the clamping bar 86 also exposes the upper surface of the cover 12 adjacent its longitudinal edges so that the trim strip 30 may be positioned over the longitudinal edges of the cover 12 with the trim strip 30 bridging the longitudinal edges of the cover 12 and extending outwardly from the longitudinal edges of the cover 12 for a substantial distance.

Figure 12:
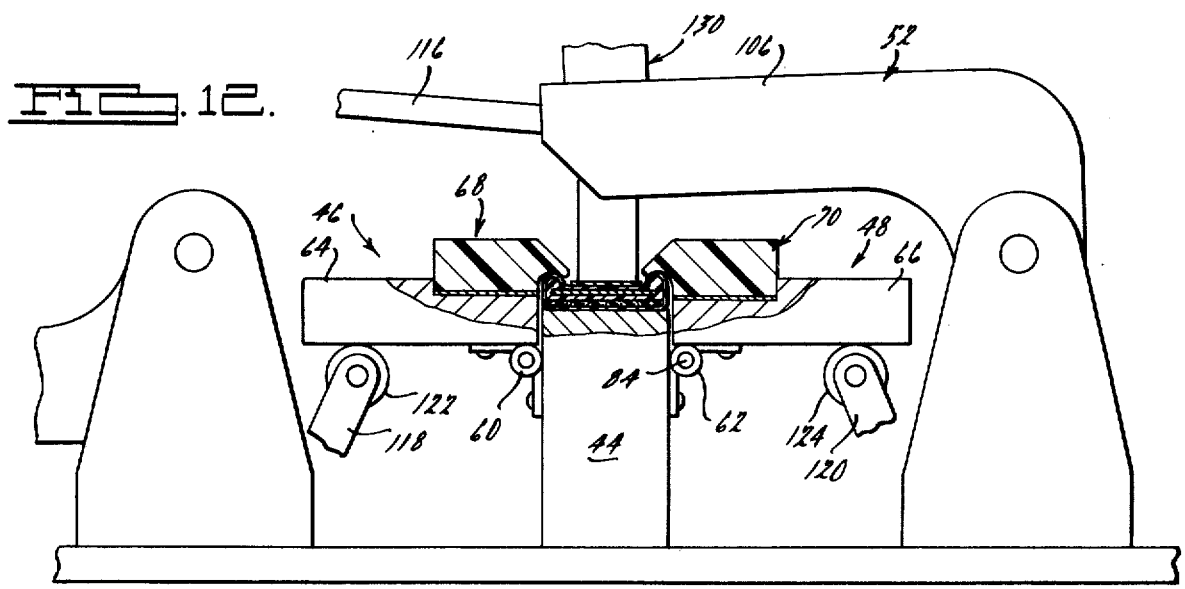

In FIG. 12, the dielectric bar 100 has been rotated counterclockwise and is positioned over the trim strip 30. A press member 130 is lowered into position on top of the support bar 52 for the dielectric bar 100. The press member 130 is forcibly moved downwardly to again compress the cushion strip 14 as illustrated in FIG. 12. While under such compression, a high energy radio frequency current is applied across the press member 130 and the base member 44. Since the steel strap 22 is electrically connected to the base member 44 by means of the clamping blocks 112, an interruption of the radio frequency energy direct current path occurs between the steel strap 22 and the dielectric bar 100. Interposed between the steel strap 22 and the dielectric bar 100 at the location of this interruption are the coating 28 on the steel strap 22, the portions of the cover 12 adjacent its longitudinal edges and the trim strip 30. The high frequency current causes dielectric heating of these interposed components so as to fuse the components together thereby bonding the upper surface of the steel strap 22 to the inside portions of the cover 12 adjacent its longitudinal edges, and the trim strip 30 to the outside portions of the cover 12 adjacent its longitudinal edges. As a result of this dielectric or fusion bonding, these components are not able to shift one relative to the other.

The dielectric bar 100 is preferably provided with a pattern on its lower surface 132 which engages the trim strip 30 to mold a pleasing design in the trim strip 30 during dielectric fusion of the trim strip 30 to the cover 12 and the strap member 22. This design is impressed upon the trim strip 30 since the trim strip 30 flows during the dielectric fusion process to assume the configuration of the lower surface 132 of the dielectric bar 100.

One such pattern is shown in FIG. 13a. The pattern of FIG. 13a represents a French stitch having parallel rows of simulated stitching at 134, which are positioned near the longitudinal edges of the trim strip 30, and parallel recesses at 136 which provide parallel raised portions on the trim strip 30 which extend longitudinally along the trim strip 30. This design simulates the stitched covering shown in FIG. 13b in which the longitudinal edges of the cover 12 appear to be rolled or folded inwardly prior to stitching. In FIG. 13b, the rolled edges are shown at 136' and the simulated stitching at 134'.

An alternative trim strip is illustrated in FIG. 14 in which a prefabricated simulated wood grain insert 138 is used in place of the vinyl trim strip 14. The insert 138 has an extruded cross section as illustrated and is preferably constructed of a vinyl material. The insert has a bonded Mylar covering with the simulated wood grain at the central portion 140 of the covering and metallized portions at the side edges 142 of the strip 138 to simulate a metallic material.

In FIG. 15, a bending apparatus 144 is illustrated for making a pair of bends in the strap 10 for the purpose of giving the strap a suitable configuration for its intended use. The bending apparatus 144 has a form block 146 and pivoted bending rollers 148 and 150. The bending form 146 has circular portions 156 and 158 having respective radii located at pivots 152 and 154 for the rollers 148 and 150, respectively. After the dielectric bonding process, the resulting straight strap 10 is positioned with the padded side toward the bending block 146 intermediate the bending block 146 and the rollers 148 and 150 as illustrated by dash lines. Each roller 148 and 150 is initially in the position shown for roller 148 (the rollers 148 and 150 operate dependently in synchronism but are shown out of synchronism to best illustrate the bending process). After positioning of the strap 10, roller 148 moves counterclockwise about pivot point 152 while the roller 150 moves synchronously clockwise about pivot 154. The strap 10 is compressed against the circular portions 156 and 158 by the rollers 148 and 150, respectively, as the rollers 148 and 150 move to the downward position (illustrated by roller 150). During this operation, the steel strap member 22 is stressed beyond the yield point so that it is deformed by the rollers 148 and 150. When the rollers 148 and 150 return to the vertical position (illustrated by roller 148), the strap 10 springs away from the form 146 as shown for the left hand portion of the strap 10. The strap retains a lesser degree of bend than the curvature of portions 156 and 158 of the bending block 146.

After the bending operation of FIG. 15, the strap 10 is removed and placed in a second bending fixture 160 illustrated in FIG. 16. The bending fixture 160 of FIG. 16 includes a pair of spaced-apart rollers 162 and an anvil 164. The anvil 164 is movable towards the rollers 162 along an axis which bisects an imaginary line drawn between the center of rollers 162. The strap 10 is placed on the rollers 162 with the padded portion against the rollers 162 and the trim strip toward the anvil 164. As the anvil 164 is moved towards the roller 162, the strap 10 assumes a reverse bend which again stresses the steep strap 22 beyond the yield point. When the strap 10 is relieved by reverse movement of the anvil 164, the ends of the strap 10 are coplanar and parallel to the central portion of the strap 10. This final configuration facilitates mounting of the strap 10 against a suitable surface.

In FIGS. 17a and 17b, two applications of the strap 10 are illustrated. In FIG. 17a, the strap 10 is mounted above a rear door 168 of an automobile. The strap 10 is provided with end fittings 170 which are applied over the attachment points to the panel 172 on which the strap is mounted. The strap 10 may be mounted by suitable metal screws or other suitable fasteners. The location of the strap 10 in FIG. 17a facilitates the entry and exit of the rear passenger compartment of the vehicle. Note that a substantial portion of the force applied to the strap 10 by an occupant's hand as the vehicle is entered or exited is applied to the rear and sides of the strap 10. The rear of the strap is comfortably padded by the cushion strip 14 so as to give a pleasing feel. With reference to FIG. 18, the sides of the strap, formed in part by the pad and in part by the adapter strip 16, is rounded and protects the user from the harsh ends of the steel strap 22. Accordingly, the pressure against the side of the strap is also substantially greater in comfort than a strap not so constructed.

In FIG. 17b a strap is shown mounted on the rear of the front seat. In the position of FIG. 17b, the strap provides a convenient hand hold for rear seat passengers for exit and entry as well as during travel. Again, the majority of the forces applied to the strap 10 are on the backside of the strap 10 and on the side surfaces of the strap 10 so that the aforementioned feel and comfort advantages are also applicable.

Referring again to FIG. 18, note that the transverse tensioning of the cover 12 rounds the rectangular cross section of the pad member 14 so that the padded portion of the strap 10 which faces the surface on which the strap is mounted is well rounded. In particular, the padded portion of the strap 10 has a somewhat elliptical configuration. Note also that the upper portion of the strap 10 has a recessed central portion at the trim strip 30 which is caused by the projecting shoulders 24 of the adapter strip 16. The simulated stitching is located within this recess portion and provides a pleasing overall appearance to the strap.

In view of the above description of the method for assembling the strap 10 and the apparatus 40 for assembling the straps, it will be appreciated that the present invention provides a means for producing padded straps in great quantities, for example, in the quantities used in the automobile industry. More specifically, the present invention provides a means for convenient manufacture of padded straps of high and consistent quality, and especially, a padded strap with the components thereof accurately positioned relative to each other, with the padded material partially compressed to provide the desired resilient feel and a tensioned cover, and with a wrinkle-free cover so as to provide an attractive appearance.

While it will be apparent that the teachings herein are well calculated to teach one skilled in the art the method of making the preferred embodiment of this invention, it will be appreciated that the invention is susceptible to modification, variation and change without departing from the proper scope of meaning of the subjoined claims.

What is claimed is:

1. A method for making a padded strap having a strap member, a cushion member, a cover having opposite edge portions, and a flexible shoulder member having shoulders at opposite edge portions comprising positioning said cushion member on said cover, said strap member on said cushion member, and said shoulder member with respect to the other of said members so that said cushion member and said cover are disposed on one side of said strap member, said opposite edge portions of said cover extend laterally outwardly of said cushion member and said strap member, and said shoulders of said shoulder member are disposed so as to extend above the side of said strap member opposite said one side;

applying a force to the side of said strap member opposite said one side to compress said cushion member;

wrapping said cover about said cushion member, said strap member, and said shoulders while said cushion member is compressed so that said opposite edge portions are disposed on said opposite side of said strap member;

engaging said cover on said opposite side of said strap member at said shoulders in a manner to independently restrain each of said shoulders from movement in either direction laterally of said strap to substantially prevent positional change of said shoulders through flexing of said flexible shoulder member but leaving said opposite edge portions of said cover exposed while maintaining said cushion member at least partially compressed; and joining said edge portions while said cushion member is at least partially compressed.

2. The method according to claim 1 wherein an engaging force is applied to said cover when said cover is engaged on said opposite side of said strap member.

3. The method according to claim 2 wherein said engaging force maintains said cushion member at least partially compressed.

4. A method according to claim 1 wherein said edges are joined by fusion bonding thereof.

5. A method according to claim 4 wherein said edges are joined by passing a high frequency current in the vicinity of said edges.

6. A method according to claim 1 wherein an engaging force is applied to said cover at said shoulders.

7. A method according to claim 6 wherein said engaging force maintains said cushion member at least partially compressed.

8. A method according to claim 1 wherein said edge portions are joined by a trim strip bridging said edge portions.

9. A method according to claim 1 wherein said padded strap, after joining of said edge portions, is bent to have an appropriate configuration for mounting.

10. A method according to claim 9 wherein said strap is heated after bending to remove any wrinkles in said cover.

11. A method according to claim 8 wherein said trim strip and edges are joined by fusion bonding thereof.

12. A method for making a padded strap having a strap member, a cushion member, and a cover having opposite edge portions comprising the steps of:

positioning said cushion member on said cover and said strap member on said cushion member so that said cushion member and said cover are disposed on one side of said strap member and said opposite edge portion extends laterally outwardly of said cushion member and said strap member;

applying a force to the side of said strap member opposite said one side to compress said cushion member;

wrapping said cover about said cushion member and said strap member while said cushion member is compressed so that said opposite edge portions are disposed on said opposite side of said strap member;

providing at least one abutment surface closely adjacent said edge portions on said opposite side of said strap member;

partially releasing the compression of said cushion member so that said cover proximate to said opposite edge portions engages said abutment surface and so that said partially compressed cushion member applies an abutment force restraining said cover in said wrapped configuration; and joining said edge portions while said cushion member is at least partially compressed with said cover being restrained in said wrapped configuration by said abutment force so that said cushion member retains a partial compression after disengagement of said cover from said at least one abutment surface.

13. A method according to claim 12 wherein said strap member is provided with shoulders at opposite edge portions extending above said opposite side thereof and wherein said cover is wrapped about said shoulders.

14. A method according to claim 12 wherein said abutment surface abuts said cover at said shoulders to retain said cover in said wrapped configuration.

15. A method according to claim 12 wherein said edge portions are joined by a trim strip bridging said edge portions.

16. A method according to claim 12 wherein said padded strap, after joining of said edge portions, is bent to have an appropriate configuration for mounting.

17. A method according to claim 12 wherein said strap is heated after bending to remove any wrinkles in said cover.

18. A method according to claim 12 wherein said edges are joined by fusion bonding thereof.

19. A method according to claim 18 wherein said edges are joined by passing a high frequency current in the vicinity of said edges.

20. A method according to claim 12 wherein said edges are further joined to said strap member.

21. A method according to claim 12 further including the step of longitudinally tensioning said cover and maintaining said longitudinal tensioning until said edge portions are joined.

22. An apparatus for constructing a strap having a strap member with longitudinally extending edges, a cushion member on one side of said strap member, a cover of substantially greater width than said strap member and also having longitudinally extending edges and means providing a pair of shoulders on the other side of said strap member which extend above a portion of said strap member intermediate said should shoulders comprising:

a base member having a base surface for supporting said cover on said base surface with said cushion member supported on said cover and said strap member supported on said cushion member so that the longitudinal edges of said cover extend laterally outwardly relative to the longitudinal edges of said strap member and so that said cover is on said one side of said strap member;

clamping means including a clamping member having longitudinal edges for applying a force to said strap member so as to compress said cushion member with said longitudinal edges of said clamping member being disposed laterally inwardly of said longitudinal edges of said strap member; and wrapping means for wrapping said cover about said strap member and said shoulders so that said longitudinal edges of said cover are located on the side of said strap member opposite said one side of said strap member and intermediate said shoulders including holding means for engaging said cover in said wrapped configuration at said shoulders so as to leave said longitudinal edges of said cover exposed, said holding means including a jaw member having an abutment surface which is rotated relative to said base member and which is configured so that said abutment surface engages said cover at said shoulder and so that a laterally inward portion of said jaw member which rotates over said shoulder is positioned substantially more proximate said intermediate portion of said strap than the point of engagement of said abutment surface with said cover at said shoulder, said holding means maintaining said cushion member at least partially compressed whereby said longitudinal edges of said cover may be joined with said cushion member remaining at least partially compressed.

23. An apparatus for constructing a strap having a strap member with longitudinally extending edges, a cushion member and a cover of substantially greater width than said strap member and also having longitudinally extending edges comprising:

a base member having a base surface for supporting said cover on said base surface with said cushion member supported on said cover and said strap member supported on said cushion member so that the longitudinal edges of said cover extend laterally outwardly relative to the longitudinal edges of said strap member and so that said cover is on one side of said strap member;

clamping means including a clamping member having longitudinal edges for applying a force to said strap member so as to compress said cushion member with said longitudinal edges of said clamping member being disposed laterally inwardly of said longitudinal edges of said strap member; and wrapping means for wrapping said cover about said strap member so that said longitudinal edges of said cover are located on the side of said strap member opposite said one side of said strap member including holding means having an abutment surface positionable on said opposite side of said strap member closely adjacent said cover so that upon release of said clamping means, the compression of said cushion member is partially relieved to cause abutment of said cover with said abutment surface, so as to engage said cover in said wrapped configuration near the longitudinal edges of said cover yet leaving said longitudinal edges of said cover exposed, said cushion member being maintained at least partially compressed by said holding means so that said partially compressed cushion member forcibly bears said cover against said abutment surface thereby retaining said cover in said wrapped configuration whereby said longitudinal edges of said cover may be joined with said cushion member remaining at least partially compressed.

24. An apparatus according to claim 23 wherein said wrapping means is rotatable with said holding means relative to said base member for wrapping said cover about said strap member and for positioning said holding means for engagement with said cover.

25. An apparatus according to claim 23 wherein said strap member is provided with shoulders at opposite edge portions extending above said opposite side thereof and wherein said wrapping means is adapted for wrapping said cover about said shoulders.

26. An apparatus according to claim 25 wherein said holding means includes an abutment surface positionable on said opposite side of said strap member for engaging said cover in said wrapped configuration adjacent said shoulders.

27. An apparatus according to claim 26 wherein said holding means abutment surface is a curvilinear surface adapted to engage said cover adjacent said shoulders.

28. An apparatus according to claim 23 wherein said wrapping means including said holding means comprises a pair of jaw members mounted for movement relative to said base member and positioned for engagement with said cover for wrapping said cover about said strap member.

29. An apparatus according to claim 28 wherein said jaw members are mounted for movement relative to said base surface of said base member so that at least a portion of each of said jaw members moves to a position on said opposite side of said strap member to wrap said cover about said strap member to position said longitudinal extending edges of said cover on said opposite side of said strap member.

30. An apparatus according to claim 29 wherein said portion of each of said jaw members includes an abutment surface positionable on said opposite side of said strap member for engaging said cover in said wrapped configuration near the longitudinal edges of said cover.

31. An apparatus for constructing a strap having a strap member with longitudinally extending edges, a cushion member and a cover of substantially greater width than said strap member and also having longitudinally extending edges comprising:
a base member having a base surface for supporting said cover on said base surface with said cushion member supported on said cover and said strap member supported on said cushion member so that the longitudinal edges of said cover extend laterally outwardly relative to the longitudinal edges of said strap member and so that said cover is on one side of said strap member;
clamping means including a clamping member having longitudinal edges for applying a force to said strap member so as to compress said cushion member with said longitudinal edges of said clamping member being disposed laterally inwardly of said longitudinal edges of said strap member; and
wrapping means for wrapping said cover about said strap member so that said longitudinal edges of said cover are located on the side of said strap member opposite said one side of said strap member including holding means having a pair of jaw members mounted for movement relative to said base member and positioned for engagement with said cover and so that at least a portion of each of said jaw members moves to a position on said opposite side of said strap member to wrap said cover about said strap member to position said longitudinal extending edges of said cover on said opposite side of said strap member, said portion of each said jaw members includes an abutment surface positionable on said opposite side of said strap member for engaging said cover in said wrapped configuration near the longitudinal edges of said cover and yet leaving said longitudinal edges of said cover exposed, said movement of said jaw members positions each of said abutment surface closely adjacent said cover so that upon release of said clamping means, the compression of said cushion member is partially relieved to cause abutment of said cover with said abutment surfaces, said cushion member being maintained at least partially compressed by said holding means so that said partially compressed cushion member forcibly bears said cover against said abutment surfaces thereby retaining said cover in said wrapped configuration.

32. An apparatus according to claim 31 wherein said jaw members are mounted for rotation with respect to said base surface of said base member for wrapping said cover about said strap member and for positioning said abutment surfaces for engagement with said cover.

33. An apparatus according to claim 32 wherein said strap member is provided with a shoulder at each opposite edge portion extending from said opposite side thereof and wherein respective ones of said jaw members are adapted for wrapping said cover about respective ones of said shoulders.

34. An apparatus according to claim 33 wherein said abutment surfaces are positionable on said opposite side of said strap member for engaging said cover in said wrapped configuration adjacent respective ones of said shoulders.

35. An apparatus according to claim 34 wherein said jaw members are rotatable to a position wherein said abutment surfaces are positioned on said opposite side of said strap member while said clamping means applies a force to said strap member to compress said cushion member and wherein said compression of said cushion member is sufficient to provide clearance for said jaw members relative to said respective ones of said shoulders during wrapping of said cover.

36. An apparatus according to claim 35 wherein said abutment surface is a curvilinear surface adapted to engage said cover adjacent said shoulders.

37. An apparatus according to claim 36 wherein said curvilinear surface has a curvature which extends to a maximum point from said opposite side of said strap member at an intermediate location thereon and wherein said shoulders are positioned substantially adjacent said intermediate location of said curvilinear surface of respective ones of said jaw members.

38. An apparatus for constructing a strap having a strap member with longitudinally extending edges, a cushion member and a cover of substantially greater width but shorter length than said strap member and also having longitudinally extending edges comprising:
a base member having a base surface for supporting said cover on said base surface with said cushion member supported on said cover and said strap member supported on said cushion member so that the longitudinal edges of said cover extend laterally outwardly relative to the longitudinal edges of said strap member and so that said cover is on one side of said strap member;
tensioning means for longitudinally tensioning said cover independently of wrapping means for said cover and prior to wrapping of said cover;
clamping means including a clamping member having longitudinal edges for applying a force to said strap member so as to compress said cushion member with said longitudinal edges of said clamping member being disposed laterally inwardly of said longitudinal edges of said strap member; and wrapping means for wrapping said cover about said strap member so that said longitudinal edges of said cover are located on the side of said strap member opposite said one side of said strap member including holding means for engaging said cover in said wrapped configuration near the longitudinal edges of said cover yet leaving said longitudinal edges of said cover exposed, said holding means maintaining said cushion member at least partially compressed whereby said longitudinal edges of said cover may be joined with said cushion member remaining at least partially compressed.

39. A method for making a padded strap characterized by a pair of laterally spaced flexible shoulders having a strap member, a cushion member and a cover having opposite edge portions comprising the steps of:

positioning said cushion member on said cover and said strap member on said cushion member so that said cushion member and said cover are disposed on one side of said strap member and said opposite edge portions of said cover extend laterally outwardly of said cushion member and said strap member;

applying a force to the side of said strap member opposite said one side to compress said cushion member;

wrapping said cover about said cushion member and said strap member while said cushion member is compressed so that said opposite edge portions are disposed on said opposite side of said strap member;

engaging said cover on said opposite side of said strap member at said shoulders in a manner to independently restrain each of said shoulders from movement in either direction laterally of said strap to substantially prevent positional change of said shoulders through flexing of said flexible shoulder but leaving said opposite edge portions of said cover exposed while maintaining said cushion member at least partially compressed; and joining said edge portions while said cushion member is at least partially compressed.

40. A method according to claim 39 wherein an engaging force is applied to said cover at said shoulders.

41. A method according to claim 39 wherein said edge portions are joined by a trim strip bridging said edge portions.

42. An apparatus for constructing a padded strap characterized by a pair of laterally spaced shoulders extending above a portion of said strap member intermediate said shoulders having a strap member with longitudinally extending edges, a cushion member on one side of said strap member and a cover of substantially greater width than said strap member and also having longitudinally extending edges comprising:

a base member having a base surface for supporting said cover on said base surface with said cushion member supported on said cover and said strap member supported on said cushion member so that the longitudinal edges of said cover extend laterally outwardly relative to the longitudinal edges of said strap member and so that said cover is on said one side of said strap member;

clamping means including a clamping member having longitudinal edges for applying a force to said strap longitudinal edges so as to compress said cushion member with said longitudinal edges of said clamping member being disposed laterally inwardly of said longitudinal edges of said strap member; and wrapping means for wrapping said cover about said strap member and said shoulders so that said longitudinal edges of said cover are located on the side of said strap member opposite said one side of said strap member and intermediate said shoulders including holding means for engaging said cover in said wrapped configuration at said shoulders so as to leave said longitudinal edges of said cover exposed, said holding means including a jaw member having a surface which is rotated relative to said base member and which is configured so that said surface engages said cover at said shoulder and so that a laterally inward portion of said jaw member which rotates over said shoulder is positioned substantially more proximate said intermediate portion of said strap than the point of engagement of said abutment surface with said cover at said shoulder, said holding means maintaining said cushion member at least partially compressed whereby said longitudinal edges of said cover may be joined with said cushion member remaining at least partially compressed.

43. An apparatus according to claim 42 wherein said abutment surface is positioned closely adjacent said cover so that upon release of said clamping means, the compression of said cushion member is partially relieved to cause abutment of said cover with said abutment surface, said cushion member remaining at least partially compressed so that said partially compressed cushion member forcibly bears said cover against said abutment surface thereby retaining said cover in said wrapped configuration.

44. An apparatus according to claim 42 wherein said holding means abutment surface is a curvilinear surface adapted to engage said cover adjacent said shoulders.

45. An apparatus according to claim 42 wherein said wrapping means including said holding means comprises a pair of said jaw members, a first jaw member for engaging one of said shoulders and a second jaw member for engaging the other of said houlders.

46. An apparatus according to claim 22 wherein said holding means abutment surface is a curvilinear surface adapted to engage said cover adjacent said shoulders.

47. An apparatus according to claim 22 wherein said wrapping means including said holding means comprises a pair of said jaw members, a first jaw member for engaging one of said shoulders and a second jaw member for engaging the other of said shoulders.

48. An apparatus according to claim 22 wherein said movement of said jaw members positions each of said abutment surface closely adjacent said cover so that upon release of said clamping means, the compression of said cushion member is partially relieved to cause abutment of said cover with said abutment surfaces, said cushion member remaining at least partially compressed so that said partially compressed cushion member forcibly bears said cover against said abutment surfaces thereby retaining said cover in said wrapped configuration.

49. An apparatus according to claim 23 wherein said movement of said jaw members positions each of said abutment surface closely adjacent said cover so that upon release of said clamping means, the compression of said cushion member is partially relieved to cause abutment to said cover with said abutment surfaces, said cushion member remaining at least partially compressed so that said partially compressed cushion member forcibly bears said cover against said abutment surfaces thereby retaining said cover in said wrapped configuration.

* * * * *